United States Patent
Yu

(10) Patent No.: US 10,701,916 B1
(45) Date of Patent: Jul. 7, 2020

(54) RETRACTABLE FISHING LINE SPOOLER FOR BOAT OR SHOP

(71) Applicant: Myong Yu, Hillister, TX (US)

(72) Inventor: Myong Yu, Hillister, TX (US)

( * ) Notice: Subject to any disclaimer, the term of this patent is extended or adjusted under 35 U.S.C. 154(b) by 312 days.

(21) Appl. No.: 15/867,538

(22) Filed: Jan. 10, 2018

Related U.S. Application Data

(60) Provisional application No. 62/444,374, filed on Jan. 10, 2017.

(51) Int. Cl.
*A01K 89/00* (2006.01)
*B65H 49/32* (2006.01)

(52) U.S. Cl.
CPC ......... *A01K 89/003* (2013.01); *B65H 49/327* (2013.01)

(58) Field of Classification Search
CPC .................. B65H 49/327; A01K 89/003
See application file for complete search history.

(56) References Cited

U.S. PATENT DOCUMENTS

| | | | | |
|---|---|---|---|---|
| 2,903,196 A * | 9/1959 | Fowler | ................ | A01K 89/003 242/388.7 |
| 4,360,172 A * | 11/1982 | Cope | .................... | A01K 89/003 242/134 |
| 4,776,527 A * | 10/1988 | Prowant | ............... | A01K 89/003 242/129.51 |
| 6,224,011 B1 * | 5/2001 | Gavaza, III | .......... | A01K 89/003 242/400 |
| 6,609,673 B1 * | 8/2003 | Johnson | ............... | A01K 89/003 242/404.2 |
| 9,016,614 B1 * | 4/2015 | Pouncil | ................ | A01K 89/003 242/566 |
| 10,149,466 B2 * | 12/2018 | Rogers | ................ | A01K 89/003 |
| 2012/0205481 A1 * | 8/2012 | Stout | ...................... | B65H 49/32 242/423.1 |
| 2017/0064933 A1 * | 3/2017 | Tseng | .................... | A01K 89/003 |
| 2019/0075771 A1 * | 3/2019 | Gordon | ............ | A01K 89/01912 |

* cited by examiner

*Primary Examiner* — William A. Rivera
(74) *Attorney, Agent, or Firm* — Karen B. Tripp

(57) ABSTRACT

A retractable fishing line spooler for mounting on a building wall or a boat surface. The spooler is positioned on a lever arm held on a mounting body. The lever arm is retracted to be in line with the mounting body when not in use and pulled partially away from the mounting body when in use for spooling fishing line. A ball bearing-and-spring locking mechanism and a pin hold the lever arm in place on the mounting body.

16 Claims, 5 Drawing Sheets

RETRACTABLE FISHING LINE SPOOLER FOR BOAT OR SHOP

RELATED APPLICATION

The present application claims priority from U.S. Provisional Patent Application No. 62/444,374, filed Jan. 10, 2017.

FIELD

The present invention relates to fishing equipment and most particularly to fishing line spoolers.

BACKGROUND

Fishing boats typically have limited storage space and most anglers have to be judicious about the use of the storage space they have. Commonly known fishing line spoolers can take up space on a boat and are typically vulnerable to being damaged in a storage compartment. Static setup fishing spoolers, which anglers commonly use, are known to simply get in the way on a fishing boat. Portable fishing spoolers with suction cups for holding them in place typically lack stability and can come unstuck at inopportune times.

A need exists for fishing line spoolers that are easy and economical to have and use on fishing boats but that do not get in the way of fishing. This need is particularly acute in fishing tournaments, where there is little if any time to return to a shop or garage to use a fishing line spooler.

SUMMARY

The present invention provides a fishing line spooler on a lever arm that can be held in a retracted position on a mounting body when not in use and easily moved to a non-retracted position for use in spooling fishing line. The mounting body is mounted to a boat surface, such as for non-limiting example, an interior of a storage compartment door, or to the wall of a building.

BRIEF DESCRIPTION OF THE DRAWINGS

The system of the present invention will be better understood by referring to the following detailed description of preferred embodiments and the drawings referenced therein, in which.

DETAILED DESCRIPTION

Figure 1:
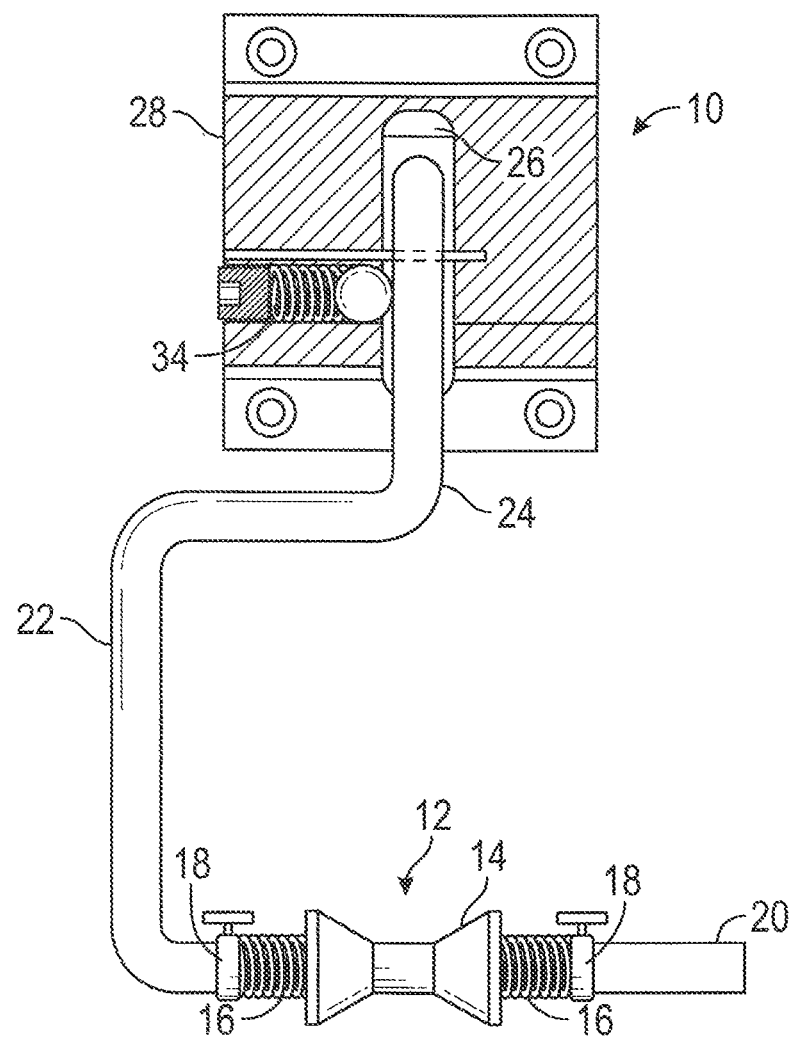
FIG. 1 is a front view of one embodiment of the retractable fishing line spooler of the present invention, with the spooler in the retracted position.

The present invention meets the need for an easy and economical fishing line spooler that can be used on a fishing boat without getting in the way of fishing. The present invention provides a fishing line spooler having a retractable design that provides the advantages of a static setup type spooler without the disadvantage of getting in an angler's way when stored on a fishing boat. Being retractable, the fishing line spooler of the invention does not require significant storage space and thus is less vulnerable to damage by storage with other items. Also, by requiring less storage space, the fishing line spooler of the invention is able to stay out of the way of fishing on the boat.

When an angler is ready to use the line spooler of the invention, the angler simply pulls out the spooler from where it is mounted and uses it to reline his or her fishing reel. When done, the spooler simply retracts back to where it was mounted and is thus put away.

This description is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness.

Figure 2:
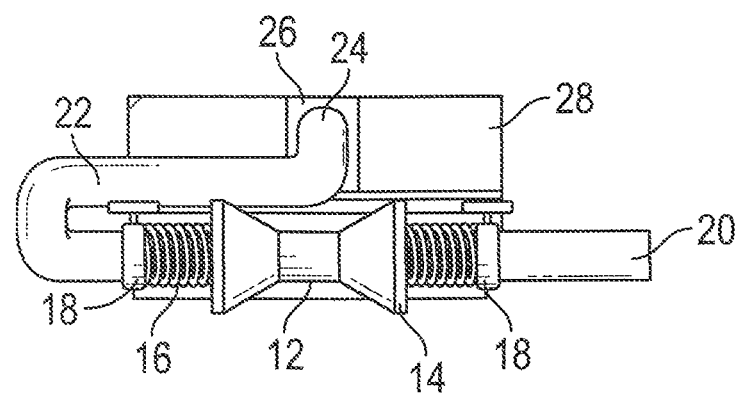
FIG. 2 is a front view of the retractable fishing line spooler of FIG. 1, with the spooler in the opened-out- or un-retracted position.
Figure 3:
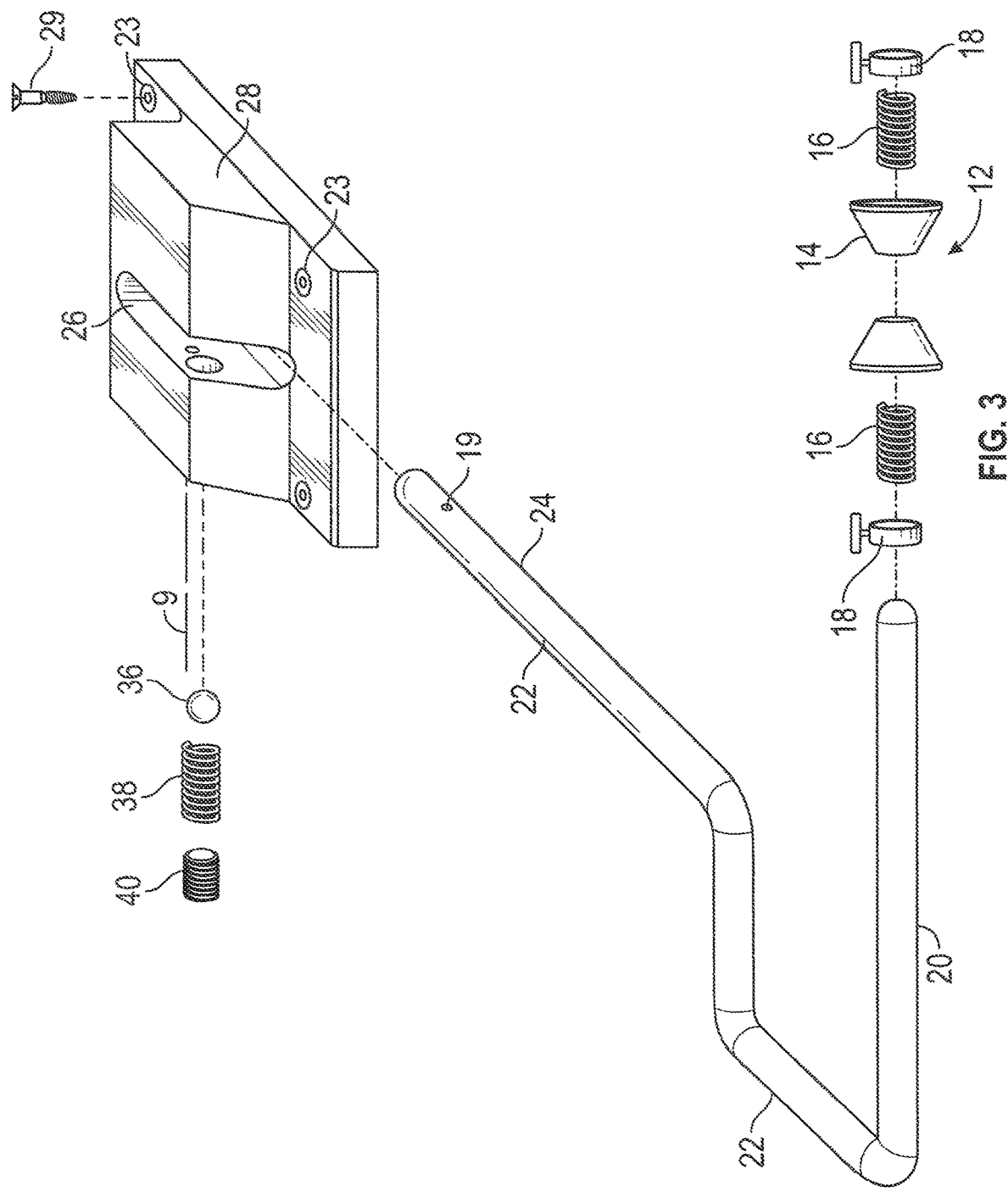
FIG. 3 is an exploded perspective view of the retractable fishing line spooler of FIG. 1.
Figure 4:
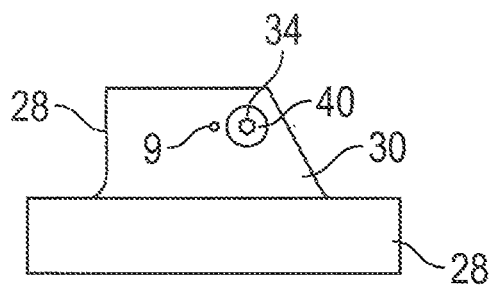
FIG. 4 is a side view of the mounting body of the retractable fishing line spooler of FIG. 1, with the spooler removed.
Figure 5:
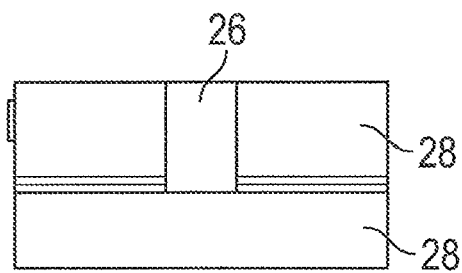
FIG. 5 is an end view of the mounting body of the retractable fishing line spooler of FIG. 1, with the spooler removed.
Figure 6:
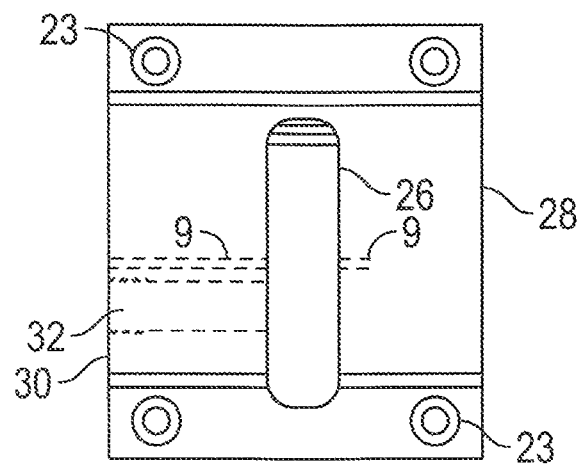
FIG. 6 is a front view of the mounting body of the retractable fishing line spooler of FIG. 1, with the spooler removed.

Referring to FIGS. 1, 2, and 3, one embodiment of a retractable fishing line spooler 10 of the invention is shown comprising a fishing line spool 12 (comprised of spindle 14 between a pair of first springs 16, capped with thumb locks 18), positioned on the proximal end 20 of a lever arm 22, which is generally "C" shaped except that its distal end 24, which opposes (or is opposite) end 20, is turned or bent or directed perpendicular to the spool 12 and end 20. End 24 of the lever arm 22 is positioned into a central channel 26 in the mounting body 28 of the spooler 10 and secured with a pin 9. Pin 9 enters side 30 of mounting body 28 and extends through hole 19 into and through end 24 of lever arm 22.

Referring to FIGS. 1, 3, 4, 6, and 7, perpendicular to channel 26 and extending from side 30 of the mounting body 28 to and through to the channel 26 is a cylindrical tunnel 32.

Figure 7:
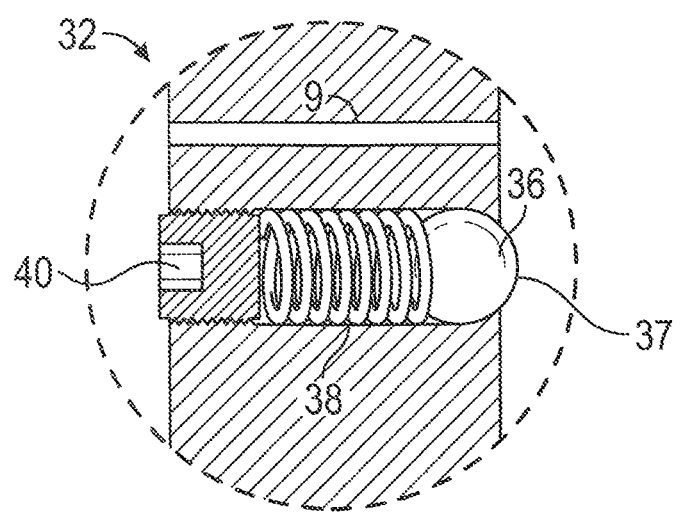
FIG. 7 is an enlarged view of the locking mechanism section of the mounting body of FIG. 6.

As shown in FIGS. 1, 3, and 7, a locking mechanism 34 (comprised of a ball or ball bearing 36, preferably comprised of steel, a second spring 38, and a plug 40 such as for nonlimiting example a National Pipe Thread or "NPT" plug) is inserted into the cylindrical tunnel 32 so that an outer surface of the ball bearing 36 abuts an outer surface of the end 24 of the lever arm 22. The ball bearing 36 is sufficiently large in diameter that the entire ball bearing 36 cannot move from the tunnel 32 into channel 26 and sufficiently small in diameter that a portion 37 of the ball bearing 36 can extend into channel 26. The locking mechanism 34 is tightened against the end 24 of the lever arm 22 (via the plug 40 from side 30 of the mounting body 28) so that the compression of second spring 38 presses or pushes a portion 37 of ball bearing 36 at least partly into channel 26 so that the locking mechanism 34 "locks" or holds or retains the lever arm 22 in the retracted position when end 24 is manually pressed against the ball bearing 36. The "lock" releases or relaxes when the lever arm 22 is manually pulled out of the retracted position for use in spooling fishing line, that is, the lever arm 22 is manually pulled outwardly from channel 26 sufficiently to prevent the ball bearing 36 from pressing on the lever arm 22. At least part of portion 37 of ball bearing 36 can remain in channel 26 when the "lock" is released (and the spooler is in the un-retracted or non-retracted position), but then a portion of the lever arm 22 rests partly on that portion 37 of ball bearing 36 in channel 26, rather than being pressed against it in channel 26.

Figure 9:
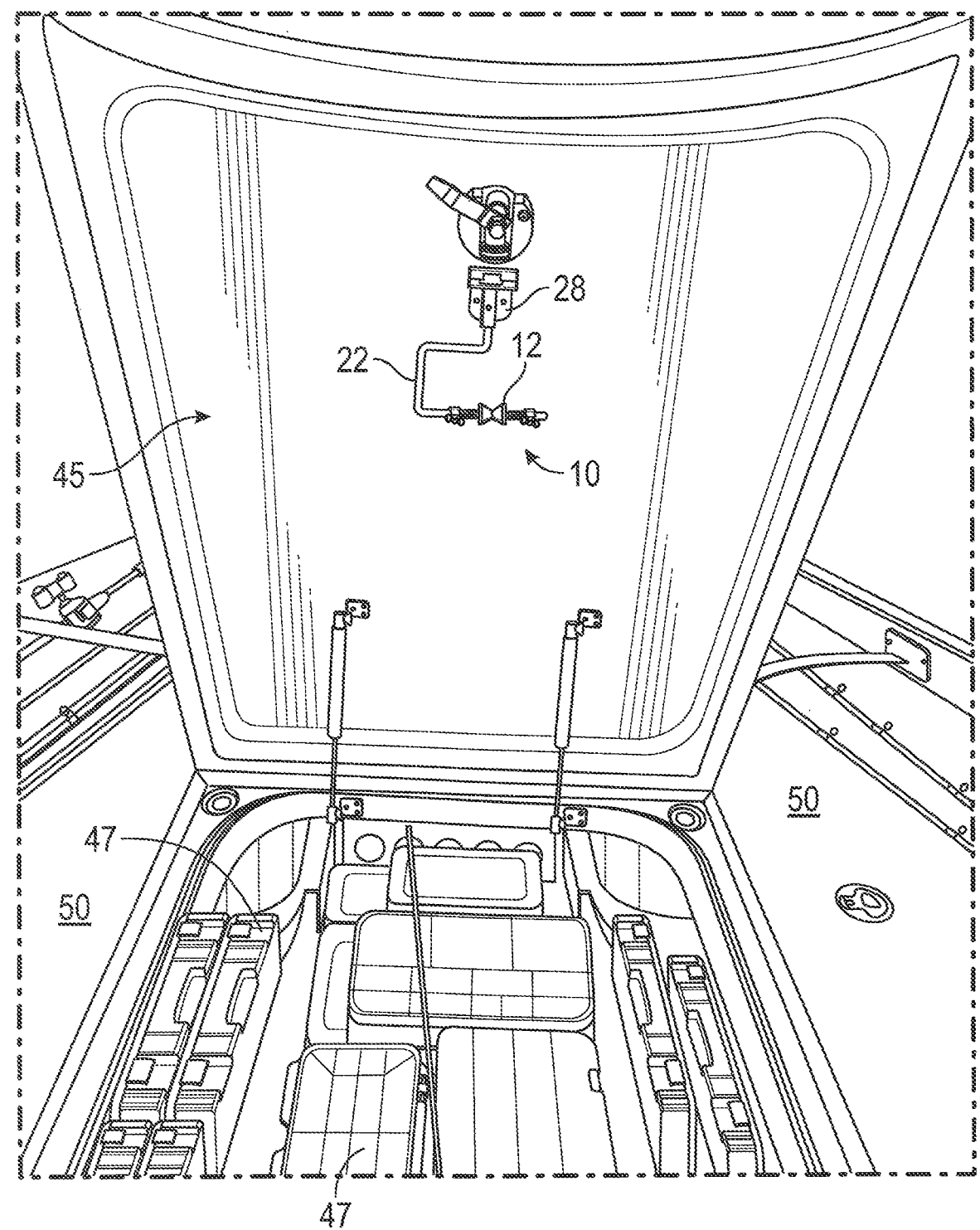
FIG. 9 is a depiction of the spooler of FIG. 8, before or after use, in a retracted position on the boat.

As shown in FIGS. 1 and 9, the spooler 10 is in a retracted position when the mounting body 28 and the lever arm 22 and spool 12 are generally planar or parallel, particularly when the mounting body 28 is mounted on a wall or surface such as a storage compartment lid or other boat surface, via screws or similar attachers 29 inserted through holes 23 in the mounting body 28.

Figure 8:
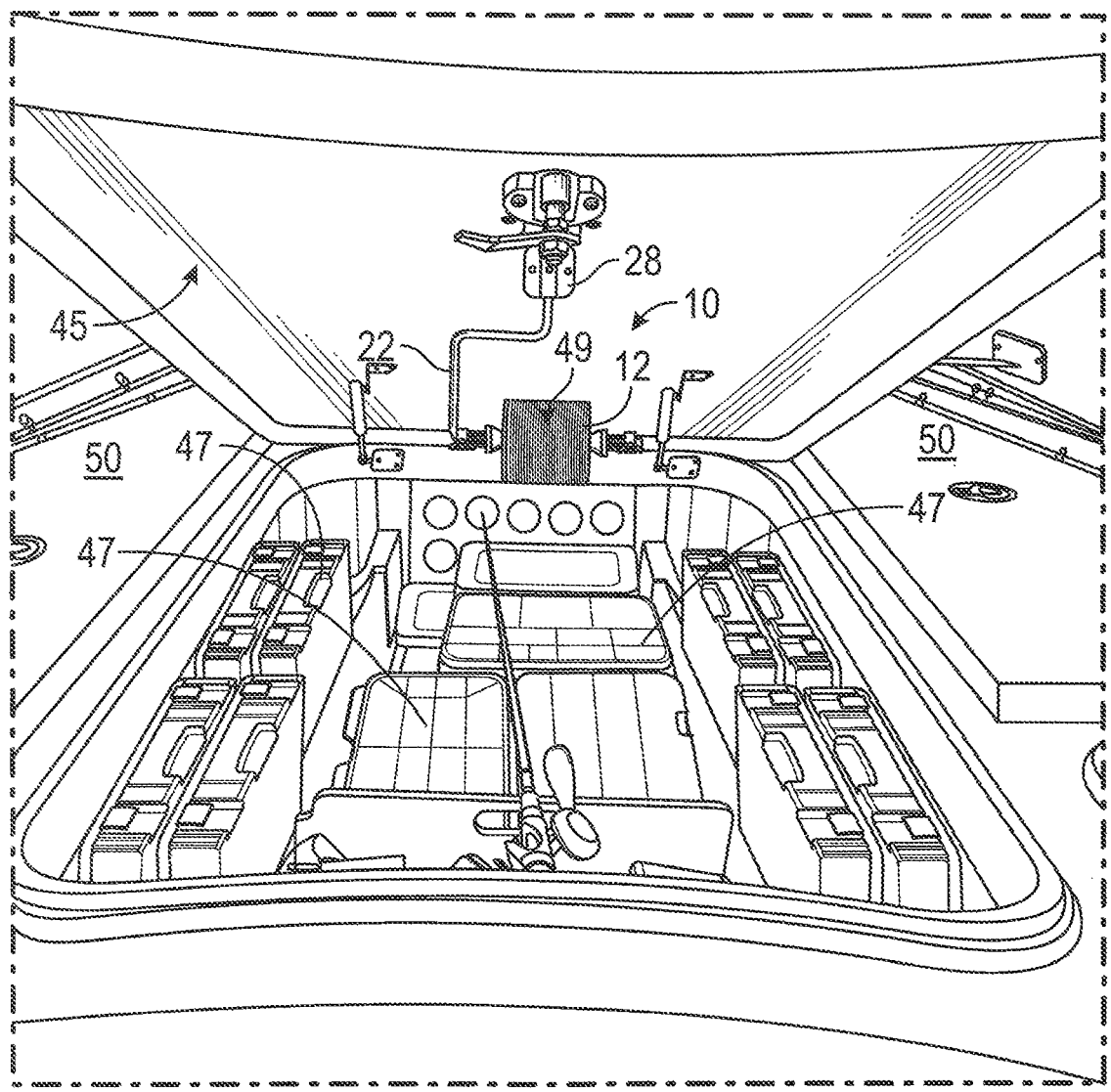
FIG. 8 is a depiction of one example of the spooler of FIG. 1 in use on a boat.

When the spooler 10 is in a relaxed or released position—the un-retracted position—ready for use, as shown in FIGS. 2 and 8, the lever arm 22 and spool 12 extend outwardly from the mounting body 28, generally hanging at an angle of less than or approximately equal to about 90 degrees with respect to the mounting body 28. Pin 9 prevents the lever arm 22 from falling out of channel 26. The presence of a portion of the ball bearing 36 in channel 26 causes the lever arm 22 to rest at said angle in the un-retracted position, and together with pressure from second spring 38, to be retained in the retracted position when pressed into channel 26 against the ball bearing 36.

The amount of the ball bearing 36 extending from cylindrical tunnel 32 into channel 26 (said amount marked for illustration as "37" in FIG. 7) depends in part on the strength or resistance capability of the second spring 38, which should be sufficient to enable the locking mechanism 32 to hold the spooler 10 in a retracted position when desired, and particularly when mounted on a boat being driven in water and over waves. The amount of the ball bearing 36 extending from cylindrical tunnel 32 into channel 26 should not, however, be so much and/or the resistance of the second spring 38 so great, that the lever arm 22 and thus spooler 10 cannot be manually moved into the un-retracted (or non-retracted) position.

FIG. 8 depicts one example use of spooler 10 installed on the inside of a lid or door 45 of a storage compartment 47 of a boat 50. In this depiction, the spooler 10 is in use, in the un-retracted position or non-retracted position, with fishing line 49 in place on spool 12. FIG. 9 shows this spooler 10 retracted on the inside of the lid or door 45 of the storage compartment 47 of boat 50, out of the way of fishing and awaiting future use in spooling fishing line.

Although one embodiment of the invention has been shown for use on a boat, the advantages of the spooler of the invention can also be appreciated in a shop or garage or other land facility.

Also, this detailed description is not intended to be exhaustive or to limit the invention to the precise form disclosed, as the invention can be practiced with modifications and alternate configurations. For non-limiting example, spool 12 is shown as a typical spool for fishing line, but other spool designs could be used. Similarly, lever arm 22 is shown as generally "C" shaped, with the "C" in angular form, for non-limiting example. However, for other non-limiting examples, a more curved style "C" shaped arm could be used in another embodiment, and a more "L" shaped arm, or even a "T" shaped arm could be used in still other embodiments. While only one cylindrical tunnel 32 and one ball bearing 36 are shown, in an alternative embodiment another cylindrical tunnel opposite tunnel 32 could be used, also perpendicular to channel 26, with an additional ball bearing extending therefrom into channel 26, so that end 24 of lever arm 22 positioned in channel 26 is "hugged" or touched by ball bearings on two sides. In still another embodiment, the cylindrical tunnel(s) could extend through the mounting body 28 at an acute or obtuse angle rather than perpendicular to channel 26. In one embodiment, a latch (not shown) is added to further secure the spooler when in the retracted position.

The spooler of the invention can be comprised of steel, stainless steel, aluminum, composite metals, various plastics, and/or polymers or other materials capable of performing the functions described herein.

Unless defined otherwise, all technical and scientific terms used herein have the same meaning as commonly understood to one of ordinary skill in the art to which this invention belongs. As used herein and in the appended claims, the singular forms "a," "an," and "the" include plural referents unless the context clearly dictates otherwise. All of the phraseology and terminology employed herein is for the purpose of description and should not be regarded as limiting. The invention is applicable to other embodiments or of being practiced or carried out in various ways, and the invention will be limited only by the claims and the equivalents thereof.

I claim:

1. A fishing line spooler for mounting on a boat surface or building wall, comprising:
   a fishing line spool;
   a lever arm for holding the fishing line spool at the lever arm's proximal end;
   a mounting body for mounting the spooler on the boat or building wall, said mounting body having a channel therein for receiving and holding the lever arm's distal end and having a cylindrical tunnel opening into said channel;
   a pin for retaining the lever arm's distal end in said channel;
   a locking mechanism comprising a spring between a plug and a ball bearing positioned in said cylindrical tunnel with the ball bearing at the opening into the channel sized such that a portion of said ball bearing extends into the channel receiving the distal end of the lever arm;
   wherein the locking mechanism retains the lever arm's distal end retracted in said channel when the lever arm is pressed against said portion of the ball bearing; and
   wherein the locking mechanism releases the lever arm's distal end to extend outward from said channel for use of the spooler when the lever arm is pulled outward or away from said portion of the ball bearing.

2. The fishing line spooler of claim 1 wherein the lever arm lies in the same plane as the mounting body when the lever arm's distal end is retracted in the channel of the mounting body.

3. The fishing line spooler of claim 1 wherein the lever arm extends outward and downward from the mounting body at an acute angle relative to the mounting body when the locking mechanism releases the lever arm's distal end.

4. The fishing line spooler of claim 1 wherein the lever arm extends outward from the mounting body at an obtuse angle relative to the mounting body when the locking mechanism releases the lever arm's distal end.

5. The fishing line spooler of claim 1 wherein the lever arm extends outward from the mounting body at a right angle relative to the mounting body when the locking mechanism releases the lever arm's distal end.

6. The fishing line spooler of claim 1 wherein the lever arm generally has a "C" shape but with the distal end bent at a right angle to enter the channel of the mounting body.

7. The fishing line spooler of claim 6 wherein the channel in the mounting body is perpendicular to the proximal end of the lever arm.

8. The fishing line spooler of claim 7 wherein the cylindrical tunnel in the mounting body is perpendicular to the channel in the mounting body.

9. The fishing line spooler of claim 8 wherein the pin enters the mounting body from a first side of the mounting body and the cylindrical tunnel also begins in the mounting body from said first side.

10. The fishing line spooler of claim 9 wherein the pin enters the mounting body, extends through the distal end of the lever arm, and ends at the side of the mounting body opposing the first side of the mounting body.

11. The fishing line spooler of claim 1 wherein the mounting body is mounted on the boat surface or building wall with screws.

12. The fishing line spooler of claim 1 wherein the mounting body is mounted on a boat surface comprising a storage compartment lid.

13. The fishing line spooler of claim 1 wherein the lever arm is manually pressed against the ball bearing for retracting the lever arm.

14. The fishing line spooler of claim 13 wherein the lever arm is manually pulled outward or away from the ball bearing for releasing the lever arm.

15. The fishing line spooler of claim 1 wherein the lever arm is automatically pressed against the ball bearing for retracting the lever arm when the spooler is not in use.

16. The fishing line spooler of claim 15 wherein the lever arm is automatically pulled outward or away from the ball bearing for releasing the lever arm for use of the spooler.

* * * * *